(12) United States Patent
Contractor

(10) Patent No.: US 7,362,851 B2
(45) Date of Patent: Apr. 22, 2008

(54) LOCATION ID SERVICE FOR TELEPHONE CALLS

(75) Inventor: Sunil H. Contractor, Marietta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 164 days.

(21) Appl. No.: 09/996,064

(22) Filed: Nov. 28, 2001

(65) Prior Publication Data

US 2002/0118812 A1    Aug. 29, 2002

(51) Int. Cl.
   *H04M 11/04*    (2006.01)
(52) U.S. Cl. .................. 379/45; 379/37; 379/32.03; 379/51
(58) Field of Classification Search ........... 379/221.08, 379/221.09, 221.1, 221.12, 207.12
   See application file for complete search history.

(56) References Cited

U.S. PATENT DOCUMENTS

| | | | | |
|---|---|---|---|---|
| 4,021,780 A | * | 5/1977 | Narey et al. | 235/54 F |
| 5,497,414 A | | 3/1996 | Bartholomew | 379/142.02 |
| 5,878,126 A | * | 3/1999 | Velamuri et al. | 379/219 |
| 5,982,867 A | * | 11/1999 | Urban et al. | 379/201.01 |
| 6,327,357 B1 | * | 12/2001 | Meek et al. | 379/218.01 |
| 6,353,664 B1 | | 3/2002 | Cannon et al. | 379/142.1 |
| 6,415,019 B1 | * | 7/2002 | Savaglio et al. | 379/45 |
| 6,633,633 B1 | * | 10/2003 | Bedingfield | 379/201.11 |
| 6,671,272 B2 | * | 12/2003 | Vaziri et al. | 370/352 |
| 6,697,783 B1 | * | 2/2004 | Brinkman et al. | 705/3 |
| 2003/0016233 A1 | * | 1/2003 | Charpentier | 345/619 |

OTHER PUBLICATIONS

U.S. Appl. No. 09/996,080 entitled: Telephone Caller Location Data Retrieval.
U.S. Appl. No. 09/996,080, entitled: Telephone Caller Location Data Retrieval, Nov. 28, 2001.

* cited by examiner

*Primary Examiner*—Ahmad F. Matar
*Assistant Examiner*—Karen Le
(74) *Attorney, Agent, or Firm*—Merchant & Gould P.C.

(57) ABSTRACT

A system for providing location ID services for telephone calls transfers location data describing the location of the calling device to the called device. Rather than or in addition to providing the name and telephone number as is done through the conventional caller ID service, the location of the calling device is displayed by the called device including the zip code, the longitude and latitude planar coordinates, or the street address. Existing advanced intelligent network infrastructure may be adapted to provide the location ID service, such as by providing location data queries from a signal switching point to a signal control point. The signal control point has access to a CNAM database containing location ID data fields in addition to conventional caller ID data.

20 Claims, 4 Drawing Sheets

500

| 502 TELEPHONE # | 504 ID SERVICES | 506 PRIVACY SERVICE |
|---|---|---|
| 123-456-7890 | LOCATION ID | NO |
| 123-456-7891 | CALLER ID | YES |
| 123-456-7892 | NONE | YES |
| . | . | . |
| . | . | . |
| . | . | . |

| 602 CALLING # | 604 CALLER ID DATA | 606 LOCATION ID DATA |
|---|---|---|
| 987-654-3210 | JOHN DOE | 30303-9999 |
| 987-654-3211 | JANE DOE | 40404-0000 |
| . | . | . |
| . | . | . |
| . | . | . |

FIG.6

LOCATION ID SERVICE FOR TELEPHONE CALLS

TECHNICAL FIELD

The present invention is related to providing information about a calling party to a called party through the telephone system. More specifically, the present invention relates to providing location data of the calling party to the called party.

BACKGROUND

Caller ID services are provided by telephone companies to permit a called party to determine who is calling even before answering the call. Caller ID services generally provide a display of the calling party's name and/or telephone number. Called parties may use the caller ID service to screen calls and/or to review the names and numbers for missed calls. Thus, caller ID has become a valuable feature of telephone service.

Often, it is also desirable for the location of a caller to be known by the called party. This is especially true in emergency situations. For this reason, automatic location provided to the 911 service being called. This enables the 911 service to dispatch assistance to the calling party's location without relying on the calling party to verbally provide the location information. However, the ALI database is accessible only by public safety answering points for 911 services and is inaccessible for non-911 telephone calls.

Other called parties may also benefit from knowing the calling party's location without relying on verbal communication. For example, a poison control center may be called, rather than 911, by a parent in response to a child ingesting a harmful substance. The situation may warrant dispatching emergency personnel to assist the child, but the location of the child must be learned by the poison control center before emergency personnel can be dispatched.

Therefore, there is a need for a location ID service that provides location information of a calling party to a called party for non-911 telephone calls.

SUMMARY

Embodiments of the present invention address the problems discussed above and others by providing a location ID service that functions independently from the 911 ALI service. The location ID service provides the location of the device used by the calling party to the device used by the called party. This allows the called party to obtain the calling party's location without relying upon verbal communication. Typically, embodiments of the present invention are implemented using components of an advanced intelligent network (AIN).

To provide the location information to the called party, a signal switching point (SSP) for the called party receives a call trigger emanating from the calling device. The call trigger may include an identifier of the calling party, such as the calling party's telephone number. The SSP for the called party generates a query containing the calling party's identifier and delivers it to a signal transfer point (STP). The STP then forwards the query to an appropriate signal control point (SCP). The appropriate SCP has access to a database containing location information for the calling party, which is indexed by the calling party's identifier. For example, the database may be the conventional CNAM database that has been adapted to contain location ID data in addition to the caller ID data.

Once the SCP has found the calling party's location information in the database, the SCP delivers the location information to the STP. The STP forwards the location information to the SSP, and the SSP sends the location information to the called party's device. The query generated by the SSP and location data transmission between the devices of the AIN may employ out-of-band signaling such as signaling system seven (SS7).

The embodiments of the present invention may also provide detection of whether called parties have subscribed to location ID service. For example, the SSP of the called party may check service tables to determine whether the called party has location ID service prior to delivering the location ID data to the called party's device. Furthermore, a determination may be made as to whether the calling party prefers privacy, and if so, the location ID data is not retrieved or delivered.

The various aspects of the present invention may be more clearly understood and appreciated from a review of the following detailed description of the disclosed embodiments and by reference to the drawings and claims.

DESCRIPTION OF THE DRAWINGS

FIG. 5 is an example of a service table referenced by a called party's service switching point.

FIG. 6 is an example of a CNAM database table adapted to provide location ID services in conjunction with caller ID services.

DETAILED DESCRIPTION

Figure 1:
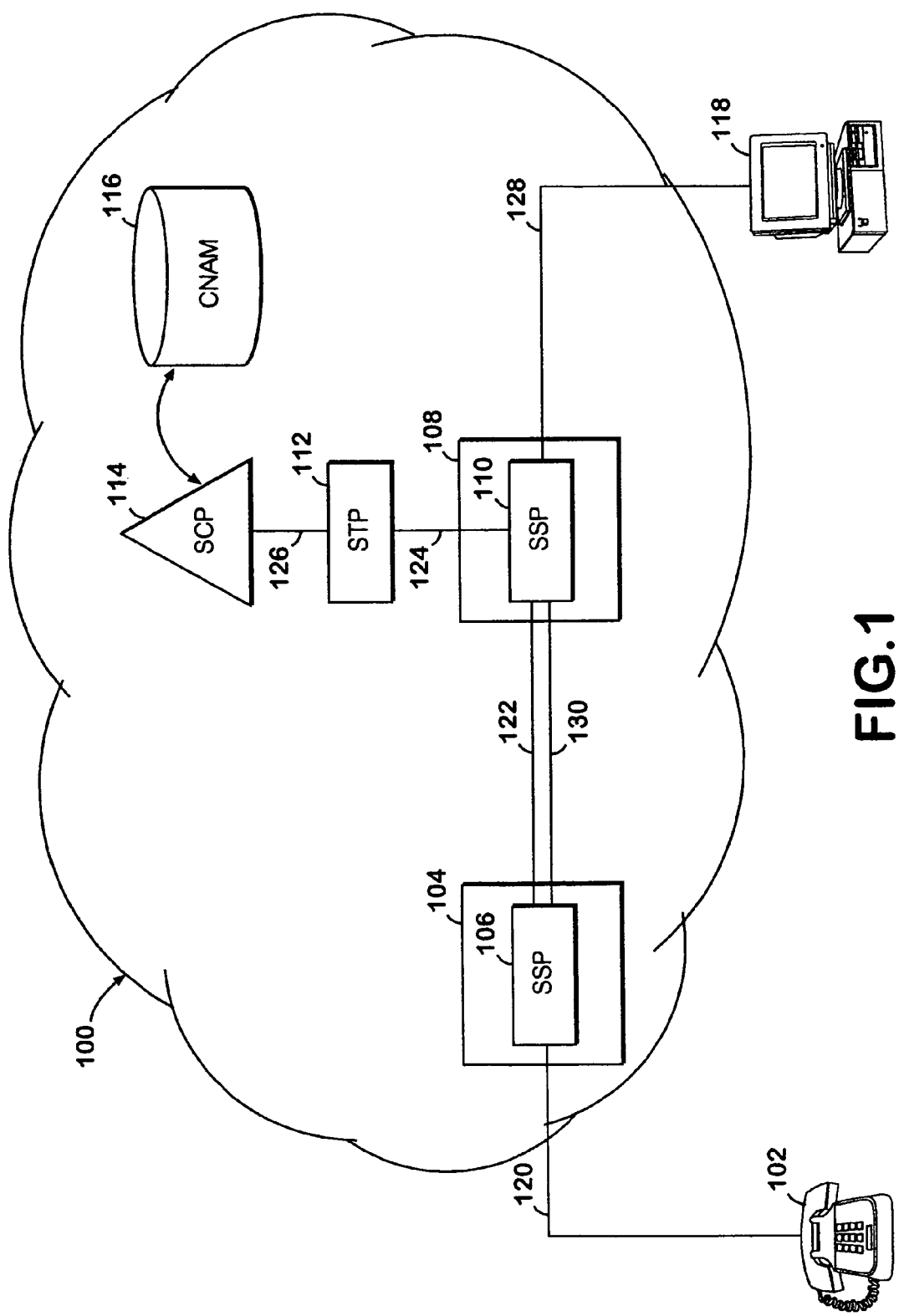
FIG. 1 shows an exemplary telephone system for implementing an embodiment of location ID services.

In FIG. 1, a telephone system is shown that employs an AIN 100. The AIN 100 is a telecommunications switching network that utilizes the well-known SS7 protocol to connect switching centers and other telecommunications resources to provide call routing and various other services. Essentially, the AIN 100 is a collection of telecommunications components and interconnections that support the generation of AIN messages known as triggers and enable the components to respond to generated triggers by generating responsive messages or by executing an associated instruction.

A conventional voice line telephone 102 is connected to the AIN 100 through a telephone line 120. Telephone line 120 leads to a Central Office 104 that maintains a switch known as an SSP 106. The SSP 106 may have a plurality of subscriber lines connected to it, such as the telephone line 120 establishing wireline telephone service. Likewise, a voice line telephone or other voice line capable device such as a computer 118 may be linked to another central office 108 and SSP 110 through a telephone line 128. The AIN can have an indefinite number of SSPs 106, 110.

The SSPs 106, 110 communicate with each other over an SS7 protocol data communication link 122 which may be established through an STP, such as but not necessarily STP 112, that routes the data packets between the two SSPs 106, 110. AIN messages may be passed between SSPs 106, 110 through the communication link 122, and these messages may include data such as the calling party's telephone number or other identifier. Voice connections between SSPs 106, 110 are established through a voice trunk 130 which carries the voice communication that occurs between the two end devices 102, 118.

A data communication link 124 is used to connect an SSP 110 to an STP 112. The STP 112 selects an appropriate SCP 114 to route the message from the SSP 110, such as in relation to the calling party's identifier. Messages are delivered from the STP 112 to an appropriate SCP 114 through a data communication link 126. The SCP 114 then responds to the message from the SSP 110 with a responsive message. The responsive message travels back to the STP 112 and then back to the SSP 110.

Much of the intelligence of the AIN 100 used to switch calls and provide other telecommunications services resides in the SCP 114. As is known to those skilled in the art, SCPs 114 were initially integrated into the AIN 100 to handle message translations and billing transactions for the implementation of 800-number services. An 800 number subscriber has at least one telephone number that can be called by a telephone user. Because there is no physical Central Office or geographic area that corresponds to the 800-area code, it is more economical to provide a few central locations at which a lookup of the directory number for an 800 call can be made. SCPs 114 may have associated databases for directory numbers corresponding to functional 800 numbers.

SCPs 114 also may have databases that contain additional data for enhanced telecommunications services such as caller ID. For example, the CNAM database 116 contains the name corresponding to the telephone number of a calling party. This name can be provided to a called party from the CNAM database 116 when ringing the called party's telephone device 118. Additionally, SCPs may be used to track the services to be provided to a particular subscriber line, such as whether or not a particular subscriber line has caller ID service.

In summary, the AIN 100 is a complex, high-speed, high call volume, packet-switched messaging system that provides a great deal of versatility in the handling of telephone calls. The SSP 106, 110 can generate a message to the SCP 114 in response to the notification of an incoming call, or call trigger, and then wait for a response from the SCP 114 before proceeding with call processing. More detailed information regarding the AIN 100 can be found in U.S. Pat. No. 5,430,719, which is commonly assigned to BellSouth Intellectual Property Management Corporation and is incorporated herein by reference.

In the example of FIG. 1, a user of the telephone 102 can ring another telephone or equivalent device 118 by dialing a directory number associated with the telephone 118. A voice link can be created between the calling telephone 102 and the called telephone 118, if the called telephone 118 answers in response to the ring. In addition to creating the voice link between the calling telephone 102 and called telephone 118, the additional services such as caller ID may be provided, as may be embodiments of location ID service discussed herein.

Figure 2:
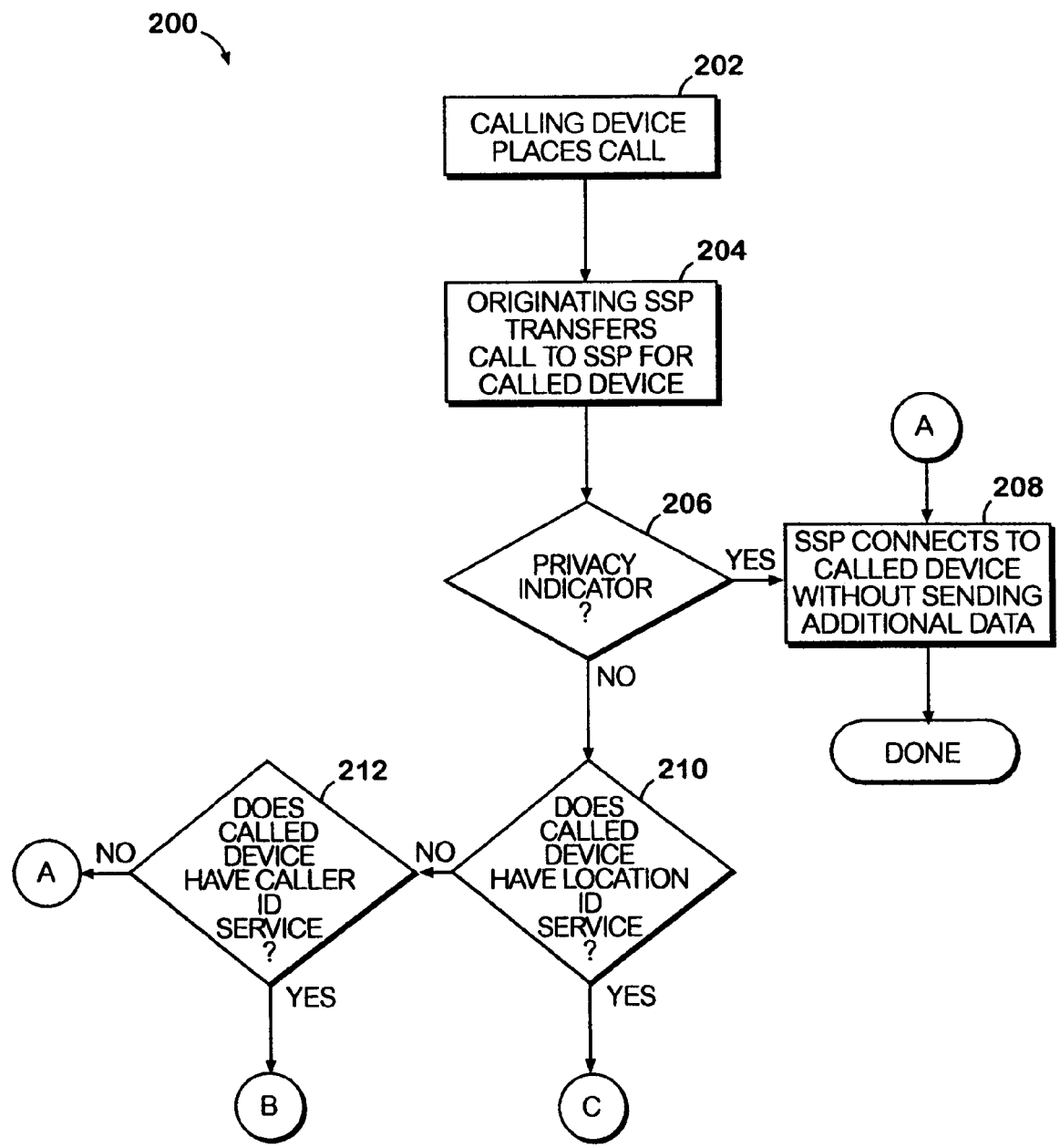
FIG. 2 is a first portion of an exemplary operational flow of the location ID services implemented by the telephone system of FIG. 1 in conjunction with conventional caller ID services.
Figure 3:
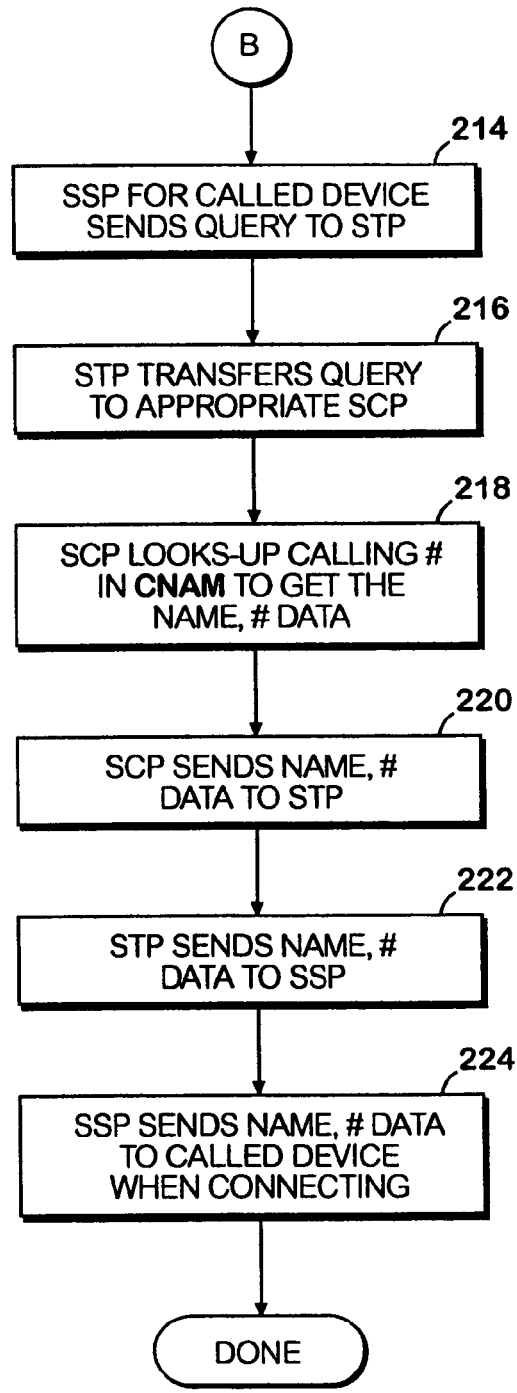
FIG. 3 is a second portion of the exemplary operational flow of the location ID services being implemented in conjunction with conventional caller ID services.
Figure 4:
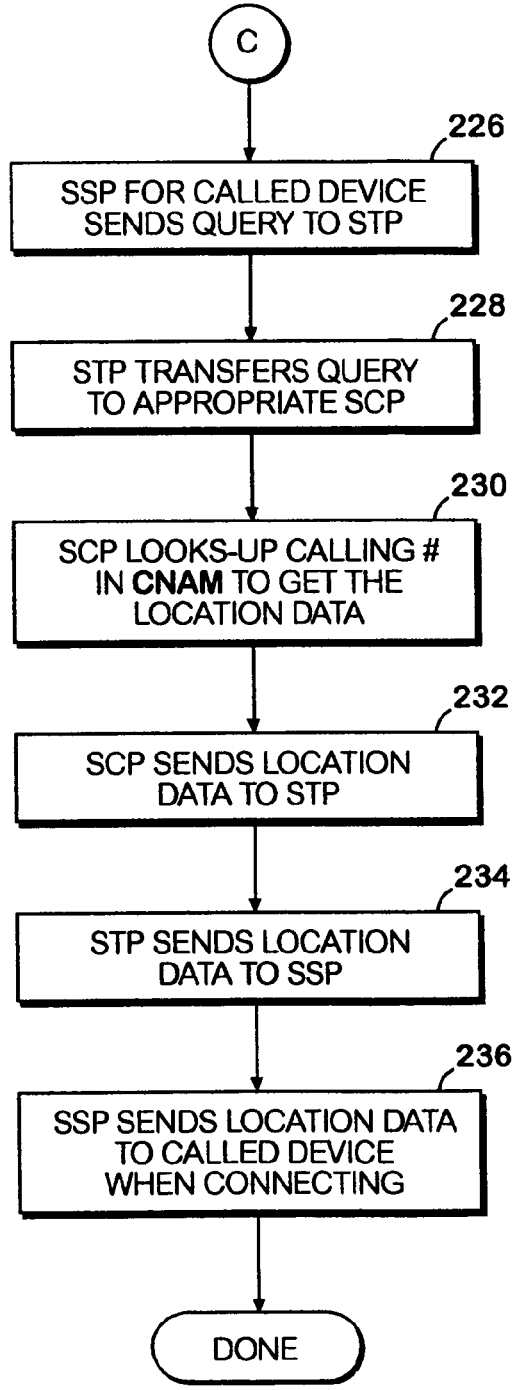
FIG. 4 is a third portion of the exemplary operational flow of the location ID services being implemented in conjunction with the conventional caller ID services.

FIG. 2 shows a first portion of an exemplary operational flow employed by the AIN 100 to provide the location ID service. As shown in FIGS. 2-4, the location ID service may be employed by the AIN 100 in conjunction with conventional caller ID service and/or call privacy service, but one skilled in the art will recognize that location ID service may also be employed alone. The operational flow of this example begins by the calling device 102 placing a call over the telephone system at call operation 202. The originating SSP 106 detects that the calling device 102 is placing a call to the called device 118 by dialing the telephone number of the called device 118, with the dialed number becoming a call trigger. At transfer operation 204, the originating SSP 106 communicates with the called party's SSP 110 by transmitting the call trigger to signal that a call to the called party device 118 has been placed. During the communication between the originating SSP 106 and the called party SSP 110, the originating SSP 106 forwards the calling party's telephone number.

The SSP 106 may also forward a privacy indicator to the SSP 110 if a privacy indicator is appropriate. At query operation 206, the SSP 106 detects whether a privacy indicator is appropriate such as by referring to local service tables, or by querying an appropriate SCP with knowledge of the calling party's services. A privacy indicator is appropriate where the calling party has subscribed or otherwise initiated privacy service to block distribution of caller ID and location ID data. Calling parties may subscribe to a continually functioning privacy service or may initiate privacy service on a call-by-call basis using a star code, where an asterisk and specific numbers are dialed prior to dialing the number of the called party. FIG. 5 shows an example of a service table 500 residing at the originating SSP 106 or at the SCP 114 associated with the calling party and containing an indication 506 of privacy service in relation to the telephone number 502 for subscribers. At query operation 206 the telephone number 502 of the calling party is referenced to determine if the calling party has privacy service.

If query operation 206 detects that a privacy indicator is present, then at call operation 208 the SSP 110 rings the called device 118 to allow the call to be answered. However, no caller ID or location ID data is transferred to the called device 118 when ringing the called device 118. If at query operation 206 the SSP 110 detects that a privacy indicator is not present, then operational flow transitions to query operation 210. At query operation 210, SSP 110 and/or an SCP associated with the called party, which may or may not be SCP 114, detects whether the called party has subscribed to location ID service by referring to its local service tables. With reference to FIG. 5, the telephone number 502 of the called party may be referenced against the ID services information 504 of a service table 500 for the called party's SSP 110 or SCP associated with the called party to determine whether the called party subscribes to location ID service.

If at query operation 210 the SSP 110 finds that the called party has not subscribed to location ID service, then operational flow transitions to query operation 212. At query operation 212, the SSP 110 detects whether the called party has caller ID service. The called party's telephone number 502 is referenced against the ID services information 504 within the service table 500 of FIG. 5 maintained by the called party's SSP 110 or the SCP associated with the called party. If the called party does not have caller ID service, then SSP 110 rings the called device 118 at call operation 208, but no caller ID or location ID data is delivered to the called device 118. If query operation 212 detects that the called party has subscribed to caller ID service, then operational flow transitions to message operation 214 of FIG. 3.

At message operation 214, the SSP 110 generates a query for the caller ID data of the calling party and sends the query message to the STP 112. The query contains the calling party's telephone number or other identifier that has been received from the originating SSP 106. At transfer operation 216, the STP 112 forwards the query to the appropriate SCP 114 that has access to a database containing the caller ID data for the calling party, such as CNAM database 116. At look-up operation 218, the SCP 114 references the calling party's number in the data table of database 116 to find the proper caller ID data. FIG. 6 shows an example of a data table 600 of database 116, which contains the caller ID data 604 such as the name that is associated with the telephone number 602 of the calling party.

Once the caller ID data has been obtained, the SCP 114 sends the caller ID data back to the STP 112 at send operation 220. The STP 112 then provides the caller ID data to the SSP 110 at send operation 222. After receiving the caller ID data from the STP 112, the SSP 110 delivers the caller ID data to the called device 118 when ringing the called device 118 at call operation 224. The called device 118 displays the caller ID information so that the called party can see who is calling prior to answering the call.

If at query operation 210 the SSP 110 finds that the called party has subscribed to location ID service, then operational flow transitions to message operation 226 of FIG. 4. At message operation 226, the SSP 110 generates a query for the location ID data for the calling party and sends it to the STP 112. The query contains the calling party's telephone number or other identifier that has been received from the originating SSP 106. At transfer operation 228, the STP 112 forwards the query to the appropriate SCP 114 that has access to a database containing the location ID data for the calling party, such as CNAM database 116 that has been adapted to contain location ID data in addition to caller ID data. At look-up operation 230, the SCP 114 references the calling party's number in the data table of database 116 to find the proper caller ID data. The data table 600 of FIG. 6 contains the location ID data 606 such as the 9-digit zip code, latitude and longitude coordinates, or street address data that is associated with the telephone number 602 of the calling party.

Once the location ID data has been obtained, the SCP 114 sends the location ID data back to the STP 112 at send operation 232. The STP 112 then provides the location ID data to the SSP 110 at send operation 234. After receiving the location ID data from the STP 112, the SSP 110 delivers the location ID data to the called device 118 when ringing the called device 118 at call operation 236. The called device 118 displays the location ID information so that the called party can see where a party is calling from prior to answering the call.

The called party may be employing a standard caller ID device to display the location ID information. In that case, 9-digit zip code location ID data or planar coordinate data may be delivered to the called party for display within the limited character spaces available as if it were caller ID data. However, the called party may employ a more sophisticated display device, such as a computer terminal that is capable of displaying many more characters than the standard caller ID display device. In that case, the full street address may be delivered to the calling party.

Furthermore, the called party's computer terminal may employ geographic informational system (GIS) software or an equivalent to provide more detail about the location of the calling party. For example, the GIS software may operate upon the location information that is received through the location ID service to map the location of the calling party. Telephone ordering/delivery services, such as food delivery, can thereby determine the proper route to deliver the ordered goods without receiving verbal instruction from the caller. Likewise, emergency services other than 911, such as poison control centers, can dispatch assistance to the location of the calling party without verbal instruction from the caller.

To facilitate data transmission of the location information beyond the called party's computer terminal, such as to GIS software that is externally provided, the location data in the CNAM database may be encoded in various formats. One example of encoding would be binary coded decimal (BCD), where each decimal number of the 9-digit zip code or planar coordinate is represented by a nibble (4 bits). Other encoding schemes are also applicable.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of providing location information of a calling device to a called device, comprising:

receiving into a terminating signal switching point a call trigger emanating from the calling device;

detecting from the call trigger at the terminating signal switching point an identifier of the called device;

receiving a privacy indicator from an originating signal switching point;

detecting from the call trigger at the terminating signal switching point whether the privacy indicator is provided from the calling device;

when it is detected that the privacy indicator is not provided from the calling device, detecting from the identifier of the called device whether to deliver location information of the calling device to the called device;

when it is detected that location information of the calling device is to be delivered to the called device, generating a query from the terminating signal switching point to a signal transfer point, the query containing an identifier of the calling device;

delivering the query from the signal transfer point to a signal control point;

accessing location information associated with the identifier of the calling device from a database linked to the signal control point, wherein the location information is encoded in binary coded decimal format wherein each decimal digit in the location information is represented by a nibble;

delivering the location information from the signal control point to the terminating signal switching point through the signal transfer point;

determining if the called device comprises one of the following: a standard caller ID device and a computer terminal;

when the called device comprises the standard caller ID device, determining a number of characters displayable on the standard caller ID device;

adapting, based on the determined number of characters displayable on the display on the called device, the location information to fit in a display of the standard caller ID device;

when the called device comprises the computer terminal, employing geographic informational system software to provide detailed routing information to the location of the calling party; and providing the location information from the terminating signal switching point to mapping software within the called device for displaying the location of the calling party.

2. The method of claim 1, wherein the location information is a zip code where the calling device is located.

3. The method of claim 1, wherein the location information is planar coordinates for a location of the calling device.

4. The method of claim 1, wherein the call trigger comprises a dialed number corresponding to the called device.

5. The method of claim 1, further comprising:
receiving the call trigger from the calling device at the originating signal switching point; and
transmitting the call trigger and identifier of the calling device from the originating signal switching point to the terminating signal switching point that generates the query.

6. The method of claim 1, further comprising detecting whether the privacy indicator is appropriate by at least one of the following: referring local service tables and querying an appropriate signal control point with knowledge of the calling party's services.

7. The method of claim 1, wherein providing the location information comprises providing the location information comprising planar coordinate data of the called party when the number of characters displayable on the display is greater than or equal to a number of characters comprising the location information comprising the planar coordinate data.

8. The method of claim 1, wherein providing the location information comprises providing the location information comprising a zip code corresponding to the called party when the number of characters displayable on the display is greater than or equal to a number of characters comprising the location information comprising the zip code corresponding to the called party.

9. The method of claim 1, wherein providing the location information comprises providing the location information comprising a street address corresponding to the called party when the number of characters displayable on the display is greater than or equal to a number of characters comprising the street address corresponding to the called party.

10. A system for providing location information of a calling device to a called device, comprising:
a terminating signal switching point configured to receive a call trigger emanating from the calling device, produce a query for location information where the query contains an identifier of the calling device, and provide the location information to the called device wherein the terminating signal switching point is further configured to receive a privacy indicator from an originating signal switching point;
a database containing location information indexed by identifiers of calling devices, wherein the location information comprises one of a zip code and planar coordinates encoded in a binary coded decimal format wherein each decimal number of the location information is represented by a nibble;
a signal control point configured to access location information from the database upon receipt of the query for location information; and a signal transfer point configured to deliver the query from the terminating signal switching point to the signal control point and deliver the location information from the signal control point to the terminating signal switching point, wherein the terminating signal switching point is configured to:
determine if the called device comprises one of the following: a standard caller ID device and a computer terminal,
when the called device comprises the standard caller ID device, determine a number of characters displayable on a display on the standard caller ID device and adapt, based on the determined number of characters displayable on the display on the standard caller ID device, the location information to fit in the display of the called device,
when the called device comprises the computer terminal, employing geographic informational system software to provide detailed routing information to the location of the calling party.

11. The system of claim 10, wherein the terminating signal switching point is further configured to detect an identifier of the called device from the call trigger and detect from the identifier of the called device whether to deliver the query to the signal transfer point.

12. The system of claim 10, wherein the terminating signal switching point is further configured to detect whether the privacy indicator is provided from the calling device and generate the query when the privacy indicator has not been provided.

13. The system of claim 10, wherein the call trigger comprises a dialed number corresponding to the called device.

14. The system of claim 10, wherein the terminating signal switching point is further configured to detect whether the privacy indicator is appropriate by at least one of the following: referring local service tables and querying an appropriate signal control point with knowledge of a calling party's services.

15. A system for providing location information of a calling device to a called device, comprising:
a first signal switching point configured to receive a call trigger emanating from the calling device and transmit the call trigger and an identifier of the calling device;
a second signal switching point configured to receive the call trigger and identifier of the calling device transmitted from the first signal switching point, produce a query for location information where the query contains the identifier of the calling device, and provide the location information to the called device wherein the second signal switching point is further configured to receive a privacy indicator from the first signal switching point;
a database containing location information indexed by identifiers of calling devices, the location information being encoded in a binary coded decimal format wherein each decimal digit in the location information is represented by a nibble;
a signal control point configured to access location information from the database upon receipt of the query for location information; and
a signal transfer point configured to:
deliver the query from the second signal switching point to the signal control point,
deliver the location information from the signal control point to the second signal switching point, determine if the called device comprises one of the following: a standard caller ID device and a computer terminal, when the called device comprises the standard caller ID device, determine a number of characters displayable on a display on the called device and adapt, based on the determined number of characters displayable on the display on the called device, the location information to fit in the display of the called device, and when the called device comprises the computer terminal, employ geographic informational system software operative to utilize the location information to provide detailed routing directions to the calling party.

16. The system of claim 15, wherein the second signal switching point is further configured to detect an identifier of the called device from the call trigger and detect from the identifier of the called device whether to produce the query.

17. The system of claim 15, wherein the second signal switching point is further configured to detect whether the privacy indicator is provided from the calling device and produce the query when the privacy indicator has not been provided.

18. The system of claim 15, wherein the location information of the database comprises one of a zip code where the calling device is located and a planar coordinate for a location of the calling device.

19. The system of claim 15, wherein the call trigger comprises a dialed number corresponding to the called device.

20. The system of claim 15, wherein the second signal switching point is further configured to detect whether the privacy indicator is appropriate by at least one of the following: referring local service tables and querying an appropriate signal control point with knowledge of the calling party's services.

* * * * *